United States Patent [19]

Ranade

[11] Patent Number: 4,661,580

[45] Date of Patent: Apr. 28, 1987

[54] OXYGEN DESORPTION FOR IMPROVED COLOR OF POLYESTERS

[75] Inventor: Gautam R. Ranade, East Lyme, Conn.

[73] Assignee: Celanese Corporation, New York, N.Y.

[21] Appl. No.: 846,676

[22] Filed: Apr. 1, 1986

[51] Int. Cl.[4] ............................................. C08G 63/60
[52] U.S. Cl. ..................................... 528/176; 528/194
[58] Field of Search ................................ 528/176, 194

[56] References Cited

U.S. PATENT DOCUMENTS 4,482,694  11/1984  Freitag et al. ...................... 528/176

Primary Examiner—Lucille M. Phynes
Attorney, Agent, or Firm—George A. Depaoli

[57] ABSTRACT

A process for forming polyesters with reduced yellow coloration wherein the polyester-forming monomers are dried in a vacuum before being reacted. The reaction system itself contains a substantially deoxygenated atmosphere. The removal of oxygen from the reactants and the reaction system leads to the lessening of yellow coloration of the polyester product.

1 Claim, No Drawings

OXYGEN DESORPTION FOR IMPROVED COLOR OF POLYESTERS

BACKGROUND OF THE INVENTION

The synthesis of polyesters from phenols, carboxylic acids, and/or phthalates is well-known in the art.

U.S. Pat. No. 4,459,384, issued to Matzner et al, discloses a process of forming a polyester or polyester carbonate in the presence of processing aids. A sulfone may be used as one of the processing aids. The polyester can be prepared by reacting bisphenol-A with mixtures of terephthalic and isophthalic acids.

U.S. Pat. No. 4,123,420, issued to Kyo et al, discloses an aromatic copolyester obtained from a mixture of terephthalic acid and/or functional derivatives thereof and isophthalic acid and/or functional derivatives thereof (with the terephthalic acid/isophthalic acid unit mole ratio being about 9:1 to about 1:9) and a bisphenol of the following general formula:

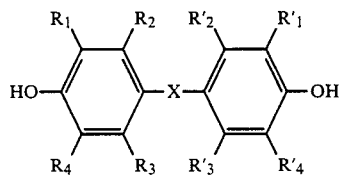

wherein —X— is selected from the group consisting of —O—, —S—, —SO$_2$—, —SO—, —CO—, an alkylene group containing 1 to 4 carbon atoms, and an alkylidene group containing 1 to 4 carbon atoms, and R$_1$, R$_2$, R$_3$, R$_4$, R'$_1$, R'$_2$, R'$_3$ and R'$_4$, which may be the same or different, each represents a member selected from the group consisting of a hydrogen atom, a chlorine atom, a bromine atom and an alkyl group containing 1 to 4 carbon atoms, or functional derivatives thereof.

Known methods for producing an aromatic copolyester include, for example, an interfacial polymerization method which involves mixing an aromatic dicarboxylic acid chloride dissolved in a water-immiscible organic solvent with an alkaline aqueous solution of a bisphenol, a solution polyermization method which comprises heating a bisphenol and an acid chloride in an organic solvent, and a melt polymerization method which comprises heating a phenyl ester of an aromatic dicarboxylic acid and a bisphenol, e.g., as disclosed in U.S. Pat. Nos. 3,884,990 and 3,946,091.

SUMMARY OF THE INVENTION

This invention relates to a method for improving the color of polyesters. In synthesis polyesters from bisphenol-A and diphenylphthalate, or DPP (diphenylisophthalic acid, diphenylterephthalic acid mixture), a yellow-colored polyester usually is the resulting synthesis product. It has been discovered that the yellow color of the polyester is due to oxidative degradation and that if oxygen is removed from the reaction process, the amount of yellow color in the polyester product, as measured by the Yellowness Index (Y.I.), can be substantially reduced. In accordance with the present invention, in order to reduce yellow coloration of the polyester product, oxygen is removed from the bisphenol-A and DPP monomers and also from the reaction system where the bisphenol-A and DPP monomers are polymerized. The method of the invention is accomplished by a degassing process consisting of drying both monomers in a vacuum at temperatures ranging from about 50° C. to about 70° C. During subsequent copolymerization of the monomers, the reactor is pressurized with oxygen-free nitrogen which maintains a positive pressure in the reactor and prevents leakage of atmospheric air into the reactor. When the reaction temperature reaches about 200° C., the nitrogen flow is stopped and a vacuum is applied to the reactor. The resulting polyester product has a Yellowness Index ranging from about 10 to about 15.

DETAILED DESCRIPTION OF THE INVENTION

The following examples will better demonstrate the process of producing polyester products of reduced yellow color.

EXAMPLE 1

A polymer of was prepared from a monomer mixture consisting of bisphenol-A, diphenylisophthalic acid and diphenylterephthalic acid. After drying the monomers overnight in a vacuum oven at 70° C., they were charged to a nickel-clad 2-gallon reactor under a N$_2$ blanket along with the potassium phenate catalyst. The reactor was then pressurized with oxygen-free nitrogen to 5 psig and then pressure reduced to 1 mmHg for 20 minutes. The pressurizing and reducing of pressure to deoxygenate the system was repeated twice more. The pressure was then reduced to about 1 mmHg and heat applied to the reactor. When the internal temperature reached 70° C., the system was pressurized to atmospheric pressure with the oxygen free nitrogen. At this point, heating was continued with a nitrogen flow while at the same time slowly reducing pressure to strip off phenol. When the internal temperature reached 200° C. and a pressure of 20 mmHg, the nitrogen flow was turned off, heat increased and maximum vacuum applied to the system. The polymerization was stopped at an internal temperature of 298° C. and the current draw of the stirrer reached 2 amperes. Having a nitrogen flow while reducing pressure to take off phenol at a faster rate may have helped in reducing color but much plugging of vacuum lines was encountered. The results are shown in Table I.

TABLE I

| EXAMPLE | 1 |
| --- | --- |
| Bisphenol-A APHA color | 10–20 |
| DPP - APHA color | <50 |
| DPP - acid No. | |
| DPP - mole % excess | 75/25 |
| DPI/DPT ratio | |
| Catalyst type | KOφ |
| Catalyst amt. (mole %) | 0.05 |
| Upheat time to 290° C. | 3 hrs. 5 min. |
| Time at 290°–298° C. | 2 hrs. 15 min. |
| Final pressure (mmHg) | 1.10 |
| Yellowness Index[1] | 14 |
| Intrinsic Viscosity (dl/gm) | 0.55 |
| Yellowness Index (solution)[2] | 14.0 |

[1] Y.I. measurement on ⅛ inch compression mold sample
[2] Solution - 5% by weight in methylene chloride

EXAMPLE 2

The drying, charging and deoxygenation steps for this polymer were similar to that used for Example 1. This experiment was to evaluate a commercial DPP monomer that was distilled in glass for reactivity and color formation in the polymer. The reaction procedure was modified by first pressurizing the system to 5 psig with oxygen free nitrogen and then applying heat to the reactor until the internal temperature reached about 190° C. At 190° C. the pressure was then reduced to 200 mmHg, and held at that pressure for 10 minutes. Pressure was decreased at 25 mmHg increments at 5 to 15 minute intervals.

During the oligomer preparation step, the internal temperature decreases and as the phenol is stripped off, the internal temperature increased to 190° C. At this point, the pressure is about 75 mmHg and the heat input was increased to raise the temperature to 290° C. while reducing pressure to the lowest pressure obtainable. The polymerization was stopped with an internal temperature of 295° C. and a stirrer current draw of 2 amperes. The resulting polymer had an I.V. of 0.54 dl/gm and a yellowness index of 10.5 on a compression molded sample. This was the lightest colored polymer produced in the lab reactor. Although the DPP had a 125 APHA color, it did not appear to have much effect on the color level in the polymer.

EXAMPLE 3

The method of preparation of this polymer was the same as for Example 2 with the exception of the deoxygenation step. In addition to pressurizing the system with oxygen free nitrogen and applying vacuum to the system repeatedly, the system was kept at the lowest pressure obtainable with stirring with an internal temperature of 70° C. overnight to deoxygenate the monomers as completely as possible before carrying out the polymerization. The DPP monomer used in this experiment had a 225 APHA color. A polymer having an I.V. of 0.52 dl/gm and a Yellowness Index (Y.I.) of 12 was produced. Again the color of the DPP had little effect on the final polymer color.

EXAMPLE 4

Preparation of this polymer was with the same method as employed in Example 2 except the final temperature was 10° C. lower with a 5% longer cycle time. The final polymer had an I.V. of 0.49 dl/gm and a Y.I. of 14.7 on a compression molded sample.

The precautions taken in eliminating oxygen in the monomers and the reactor system and preparing the oligomer at a lower temperature aids in reducing the color of the polymer. Use of higher colored DPP monomers did not appear to have much of an effect on the polymer color with the use of the above-mentioned precautions and preparation methods.

A summary of the results of Examples 2-4 is listed in Table II.

TABLE II

| EXAMPLE | 2 | 3 | 4 |
|---|---|---|---|
| Bisphenol-A APHA color | 30 | 30 | 30 |
| DPP - APHA color | 125 | 225 | 225 |
| DPP - acid No. | 0 | 0.19 | 0.19 |
| DPP - mole % excess | 0.2 | 0.2 | 0.2 |
| DPI/DPT ratio | 71/29 | 64/36[2] | 64/36[2] |
| Catalyst type | KOφ | KOφ | KOφ |
| Catalyst amt. (mole %) | 0.05 | 0.05 | 0.05 |
| Upheat time to 290° C. | 55 min. | 3 hrs. 50 min. | 3 hrs. 45 min.[3] |
| Time at 290°-298° C. | 1 hr. 10 min. | 3 hrs. 50 min. | 1 hr. 30 min.[4] |
| Final pressure (mmHg) | 2.15 | 0.35 | 0.43 |
| Yellowness Index[1] | 10.5 | 12 | 14.7 |
| Intrinsic Viscosity (dl/gm) | 0.54 | 0.52 | 0.49 |
| Yellowness Index (solution)[5] | 10.9 | 11.6 | 12.1 |

[1] Y.I. measurement on ⅛ inch compression mold sample
[2] DPI/DPT ratio off due to mischarge
[3] Upheat time to 280° C.
[4] Time held @ 280°-285° C.
[5] Solution - 5% by weight in methylene chloride

EXAMPLE 5

Monomer Purification

A sample of a commercial DPP monomer of Example 2 was distilled in a glass column containing protruded nickel packing. The distillation was slow and a pot temperature of 255° C. while under reduced pressure was required to distill the monomer. Three fractions were taken with each fraction increasing in color with the last fraction having a pink color and a 175-200 APHA color. The distillation was repeated using an unpacked column. A pot temperature of 235° C. while under reduced pressure was needed to distill the monomer which was 20° C. lower than needed when using a packed column. The distilled product had a light yellow color having a 125 APHA color and an acid number of zero.

From past experience, the use of higher temperatures to distill DPP monomers usually results in a pink color in the distilled material.

What is claimed is:

1. In a process for preparing polyesters from bisphenol-A and diphenylphthalate monomers, the improvement which comprises vacuum drying the monomers at temperatures from about 50° C. to 70° C., and thereafter polymerizing the monomers in a deoxygenated atmosphere of nitrogen to obtain a polyester product having a reduced yellow coloration.

* * * * *